Oct. 16, 1951   S. F. GORSKE   2,571,232
SPRING CLUTCH DEVICE
Filed April 20, 1948

STANLEY F GORSKE
INVENTOR.

BY *George M Soule*
ATTORNEY

Patented Oct. 16, 1951

2,571,232

UNITED STATES PATENT OFFICE 2,571,232

SPRING CLUTCH DEVICE

Stanley F. Gorske, Indianapolis, Ind., assignor, by mesne assignments, to The Marquette Metal Products Company, Cleveland, Ohio, a corporation of Ohio Application April 20, 1948, Serial No. 22,171

7 Claims. (Cl. 192—41)

The invention relates to a torque transmitting device employing a helical friction band in the form of a coil spring. The invention as illustrated herewith is embodied in an overrunning spring clutch of the single internal clutch drum type wherein the clutching pressure necessary to carry the maximum torque tends to become concentrated at one end of the spring as a whole, as between a terminal load-carrying coil of the spring and the coacting drum. The drum may be internal or external.

Such single drum type of spring clutch is especially suited to installations in which axial space is limited. The common practice in that type of spring clutch is to anchor one terminal coil directly, as by means of a lug or bent-out toe portion of the coil, to one of two coaxial members to be clutch-coupled, the other member having the drum against which the spring coils are caused, by any suitable energizing means at the opposite low-load-carrying end of the spring, to be brought progressively into metal-to-metal contact with the drum and with increasing clutching pressure toward the peak-load-carrying or anchored terminal coil. If such a clutch, as usually constructed, is subjected to repeated loading and unloading, the wear on the anchored terminal coil and its coacting drum surface is pronounced and follows a distinctive pattern which varies in different designs.

An object hereof is to provide a clutch spring for such use as mentioned which will be more durable and lasting than comparable springs heretofore employed, being so constructed as to eliminate excessive wear of the terminal load carrying coil and breakage thereof at its connection to a cooperating member, without increasing to any appreciable extent the cost of manufacture of the clutch spring or of the clutch assembly in which it is employed.

A more specific object is to provide an improved clutch spring for eliminating wear heretofore encountered at the clutching surface of the terminal load-carrying coil, due to the tendency of the terminal coil to be seated tightly against its coacting drum surface prematurely in relation to the seating of enough other load-carrying coils to carry the required load, and then having to slip against said surface under extremely high pressure, in order to enable progressive seating of such other coils.

A further object is to provide an improved torque transmitting anchorage of the bent-out toe type between a clutch spring and a cooperating clutch member.

Figure 1:
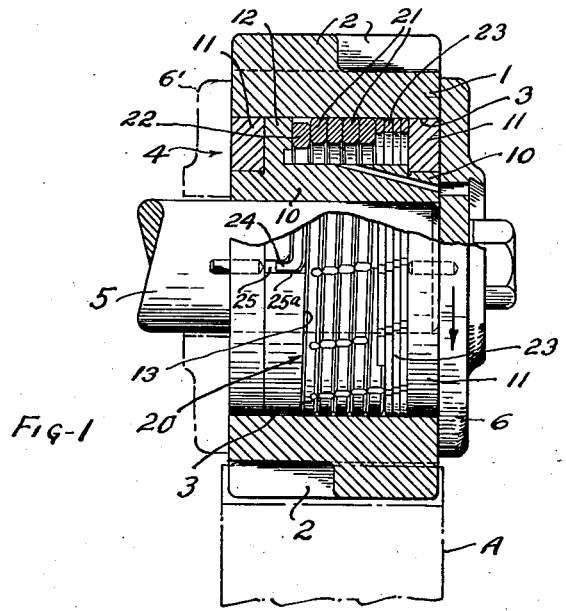
Figure 2:
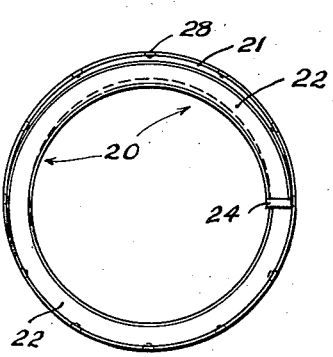
Figure 3:
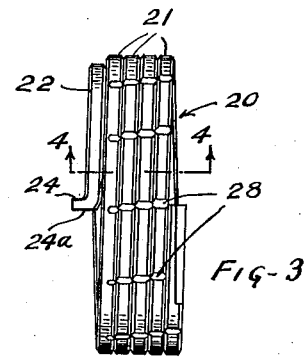
Figure 4:
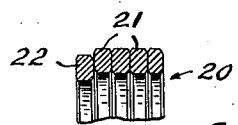
Figure 5:
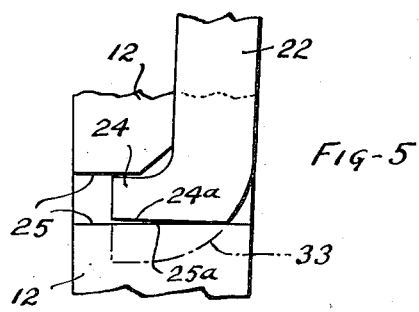

To illustrate the invention, a gear driven spring clutch unit of the expanding-to-grip (internal drum) type is shown in the drawing, although the invention is equally applicable to contracting or wrap-down (external drum) type spring clutches. Fig. 1 of the drawing is a side elevation of a gear driven spring clutch unit, partially in central section, embodying the improved clutch spring; Fig. 2 is an end elevation of the load-carrying coil portion of the clutch spring shown in Fig. 1; Fig. 3 is a side elevation of said portion of the spring; Fig. 4 is a fragmentary longitudinal central section thereof, as indicated on Fig. 3, and Fig. 5 is an enlarged detail view of the improved clutch spring anchor or toe portion and a receiving slot therefor.

The gear driven spring clutch unit illustrated is designed for providing an overrunning or "free-wheeling" drive for the cooling fan of an internal combustion engine and comprises a driving member 1 in the form of a gear with teeth 2 on its outer periphery for meshing engagement with a timing gear or other driving gear suggested at A. The gear 1 is formed with a smooth, cylindrical concentric bore 3 receiving a clutch spring anchorage helix and bearing assembly 4 turnable freely in the bore. Said assembly is mounted on a driven shaft 5. The fan or ultimate driven member (not shown) is attached to the shaft 5 for rotation thereby. In service the shaft 5 repeatedly overruns the driving gear, requiring frequent locking up and releasing operations on part of the clutch mechanism.

Helix and bearing assembly 4 comprises a sleeve-like member 10 suitably secured to shaft 5 for rotation therewith, and has bearing ring members 11 mounted on each end thereof in running fit relationship to the bore 3, for rotatably supporting the driving gear 1 on the driven shaft 5. Said shaft has appropriate bearings (not shown) in the engine served by the fan. At one end of the sleeve 10, adjacent the bearing ring 11, the sleeve has an annular flange 12, formed with a helical inner face 13.

The clutch spring 20 comprises, as shown, a series of load-carrying coils 21, terminating, at the left, in an end load-carrying coil 22, the axially disposed outer surface of which is approximately complementary to the helix face 13 and normally abuts it. The spring is maintained concentric with the bore 3 of the driving gear 1 solely by peripheral contact of its coils 21 therewith, the bore forming a cylindrical clutch drum surface for gripping engagement by the clutch spring. A thrust plate 6 at one end of the clutch assembly secured to the end of the driven shaft 5 serves to hold the clutch assembly against endwise movement upon shaft 5 to the right; and a similar plate 6' (suggested by broken lines) is carried by an associated bearing (not shown) for supporting the shaft 5 and holds the assembly against undesired leftward movement.

Connected to the right hand terminal load-carrying coil of the clutch is a teaser or energizing device shown in the form of a series of light gage coils 23, one or more of which is or are slightly oversize in reference to the drum 3. The coils 21, on the other hand, (to minimize overrunning friction) have an outer diameter substantially the same as that of the bore 3, except for the end or terminal coil 22, described later, so that the load-carrying coils, when relaxed or contracted, will rotate freely in the overrunning direction within the drum surface 3. In the opposite fan-driving direction the load-carrying coils are actuated by the teaser coils so as to be unwound and expanded progressively into clutching engagement with the drum surface. The end coil 22 has an axially extending toe 24 formed thereon (later described in detail) which extends into a radial parallel-sided slot 25 in the helix flange 12 of the sleeve 10 for positively connecting the clutch spring to the driven shaft 5 through the sleeve 10.

In operation, when gear 1 is rotating in the direction of the arrow, Fig. 1, the energizing coils 23, being in light but metal-to-metal engagement with the surface 3, grip the surface 3 and the coils 21 being attached to the coils 23 are caused progressively to expand from right toward left into tight, clutching engagement with the clutch surface 3, to lock the various parts together. The toe 24 of the spring being engaged in the slot 25, torque is transmitted from the rotating gear 1 through the spring 20 and toe 24 to the sleeve 10 and connected shaft 5.

At the start of each clutching operation the terminal load-carrying coil 22 will have the same unwinding force applied to it as applied by the teaser to the terminal load-carrying coil at the opposite end of the spring; hence said coil 22 also tends to act undesirably as an "energizing" coil. One reason for the known practice of notching the load-carrying coils as by circumferentially spaced slots 28, Figs. 1 and 3, of decreasing depth toward but not intersecting the clutching surface of the anchored terminal coil is to make said terminal coil stiffer than the others with the view to reducing its ability to become expanded prematurely into contact with the co-acting drum surface. Sometimes the anchored end of the spring and/or the adjacent drum surface is or are given special surface treatment (hardening, chrome plating, etc.) by way of minimizing wear resulting from such "energizing" action on part of the anchored terminal coil.

In a theoretically perfect clutch spring the load-carrying coils, comparable to coils 21, would be made to increase in stiffness (as by gradually enlarged radial and/or radial and axial cross section so that at the region of the spring (part of coil 22 in the illustrated example) where the radial pressure reaches the maximum value the flexure resistance or stiffness would be correspondingly increased. Such a clutch spring would be prohibitively expensive for commercial purposes hence the common practice is to make all the load-carrying coils 21 from a single strand of wire stock of uniform section as illustrated in the present case.

As hereinbefore indicated, a clutch spring made with uniform diameter coils of uniform section stock and having a circumferentially anchored terminal load-carrying coil becomes excessively worn at certain regions of the terminal coil and the coacting clutch drum surface is frequently galled or scored from the same causes. The regions of the spring at which the wear and other destructive effects mentioned are concentrated and the extent of those effects around the coil in opposite directions from the pressure concentration point vary in different designs of spring clutches, e. g. according to the coil diameter in relation to the axial and radial dimensions of the spring stock and its sectional shape. In each case the pressure concentration points and relative pressure values can be calculated but without establishing a sufficiently practical rule for other cases so as to enable production use thereof in many different designs.

Investigation of the wear phenomena indicates that, as the load-carrying coils at the energizing end of a conventionally wound clutch spring of the type shown go into clutching contact with the drum surface, portions of the torsionally anchored end coil expand into tight metal-to-metal contact with the drum surface simultaneously therewith whereas the desired operation would be for the load-carrying coils to engage progressively (as from right to left Fig. 1). The coil corresponding in position to 22 hereof engages prematurely partly because its terminal portion has only a cantilever support, i. e. it is unsupported radially by two adjacent contiguous coils. The torsional anchorage provided by the toe and slot connection 24, 25 purposely has as little as possible restraining influence on radial expansion of the adjacent end coil, at least at commencement of application of load. The torque-transmitting force of the shoulder 25a of the slot 25 on the toe 24 of the spring is applied tangentially of the associated cantilever-supported end portion of the spring wherefore only a relatively low value resultant friction force on the drum tends to be applied by the very end portion of the spring adjacent the toe, the inherent flexure resistance of the spring stock also being an important factor. The tangential forces are resolved into radial forces increasingly along the coil, away from the toe, and apparently tend to produce a maximum pressure point or region at approximately 90° from the toe. As the pressure falls off toward the opposite energizing end of the clutch spring such wear is gradually reduced. In any event, and evidently largely because of the nearly purely cantilever support for the free end coil, the maximum pressure region of said coil is thrust against the clutch drum before enough of the other load-carrying coils to carry the instantaneous load are seated; and, because those coils are effectually prevented from slipping by the several turns of energizing coils 23 and their own increasing coil-pressure-buildup effect the maximum pressure region at the toe-connected end, in metal-to-metal contact with the drum, has to slip so as to enable more of the load-carrying coils to become seated. Even though the various coils 21 in relaxed condition initially "fit" the drum or pocket they expand slightly during the clutching operation as they squeeze out the usual oil film. Such metal-to-metal skidding is very sudden, and because of repetition at short intervals has a notable destructive effect because of the tremendous pressures and friction involved. Once a measurable amount of such wear has occurred the flexibility of the worn portion tends to increase rapidly hence the rate of wear increases proportionately.

As stated above, the extent of wear around the end load-carrying coil and the depth of wear at different portions thereof in a conventionally wound spring vary greatly in different spring designs and those characteristics are also affected by the amount and/or abruptness of application of load on the clutch. However, usually, the wear is of greatest depth at a region approximately 90° from the toe and gradually decreases in depth in each direction around the coil from that region.

I have found, and cite by way of example only, that if the end coil, in this particular design, is preformed as shown in Fig. 2 in any suitable way (as by dies) so as to bring it gradually inwardly in respect to the main coil diameter, starting about 240° from the toe 24 to a distance of .013″–.008″ opposite the toe; .023″–.018″ 90° from the toe, and, finally, .005″–.002″ adjacent the toe, there will be no more, and incidentally no measurable amount less wear on the end coil than on any of the other load-carrying coils. Consequently such preforming of the end coil does not detract from the load-capacity of the clutch spring (does not shunt a portion of the spring out of action) but materially lengthens its useful life. Moreover, its radial depth of section hence its bend resisting strength remains unchanged and the coacting drum surface is not scored or galled in service. The expansion of the end coil 22 into full clutching contact with the surface 3 occurs only in case all the other load-carrying coils come into firm clutching contact but still refuse to carry the load.

To summarize the above discussed phase of the invention: The toe-connected or torsionally anchored end portion of the clutch spring is so preformed that unwrapping of the spring does not cause engagement of the end coil portion of the spring until all coils from the energizing end of the spring have become engaged; and slippage at the torsionally anchored end is not necessary and does not take place within the maximum load-carrying capacity of the spring. Thus wear due to slippage is minimized because it is not necessary to slip any of the coils within the capacity of the clutch. All portions of each coil, from the energizing end, progressively carry instantaneous peak radial loads as loading is increased from zero to the maximum capacity.

As a practical method of arriving at the proper form of end coil 22, without performance of tedious computations, a normally wound (e. g. entirely cylindrical) clutch spring of the desired design may be mounted tightly in a hollow non-rotating mandrel or chuck and the end coil, through its toe 24 or otherwise (assuming the spring is in the position illustrated in Fig. 2) is then subjected to clockwise-applied tangential force of a magnitude corresponding to the maximum load torque the toe is expected to carry in service. Thereby the end coil will be deflected into about the form it should have (e. g. coil 22, Fig. 2) in order to resist premature seating against the drum surface 3, as described above; and the inward deflection of the various portions of the end coil may be measured or recorded by an ordinary dial indicator instrument mounted to rotate on the axis of the clutch spring so as to traverse the end coil longitudinally of it. In the test operation described the toe 24 (as would be the case in actual clutch service) is substantially free to move inwardly and is not held in its original radial position. The production clutch springs are then made with the end coil preformed and brought inwardly at least to the extent indicated by the described operation on such test spring. The operation of deflecting a conventionally wound terminal spring coil as described does not simulate the action to which the end coil 22 is subjected in service in the clutch since, in service, the direction of applied tangential force on the toe 24 is counter-clockwise in an expanding-to-grip spring clutch. That would tend to bend the end coil outwardly beyond the other coils rather than inwardly beyond them in the absence of restraining support. However, the result is nearly the same as when the various forces acting during clutch service are calculated to determine the required end coil shape.

In a contracting-to-grip or wrap-down type spring the toe-connected or normally highest-load-carrying end coil would be preformed outwardly from the other coils instead of inwardly.

As shown particularly in Fig. 5, the toe 24 which is formed as a bent-out portion of the end coil 22 is slidably fitted into the slot 25, that much being conventional in spring clutch construction. Enough clearance is ordinarily provided between the toe and slot so that the toe is substantially unrestricted in its radial movement. It has been the practice to simply bend the toe from the body of the end coil, so that its radial and circumferential section is about the same as that of the body of the coil. Thereby, due to concentration of driving force out of line with the end coil there is a resultant flexing of the connecting metal between the toe and the body of the spring, each time the clutch goes into action, tending to break off the toe. By forming the toe as by grinding at 24a on the outside face of the toe the flexibility of the toe is increased gradually away from the zone of connection, resulting in greater effective life of the spring as a whole regardless of the exact form of receiving slot 25. The degree of reduction in width of the toe portion of the spring is governed by the safe stress factors of the spring stock.

The shoulder 25a of the slot in the helix flange 12 is easiest to form as a radial surface parallel to the clutch axis. If the adjacent faced-off shoulder 24a on the toe 24 is normal to the spring stock at the end of the coil proper said face will be slightly inclined relative to the shoulder 25a about as indicated in Fig. 5. The free end of the toe can, in quantity production, be slidably fitted to the slot to prevent undesirable backlash between the clutch spring and helix flange 12; and the driving force of the shoulder 25a against the spring end will be concentrated in circumferential alignment with the associated portion of the coil 22 whereby said force will impose no destructive bending action on the zone of connection between the toe and coil proper. Enough stock from the outer radius 33 of the toe (shown dotted) is removed to form the face 24a so that the toe is always relieved of subjection to cantilever strain when the shoulder 25a is acting on the end coil 22 in the proper direction to expand that coil against the clutch drum surface provided by bore 3 of gear 2.

I claim:
1. A helical load-carrying friction torque transmitting spring member, comprising a series of coils wound from uniform section stock to provide a helical series of friction surfaces for cooperation with a circular drum surface, said spring having a terminal coil portion in a position such that it would normally be subjected to peak load torque transmitting pressure against the drum surface in the operation of the spring, said terminal coil portion being preformed between one-half and three-quarters of its circumference in offset relation to the other coils radially away from the friction surfaces thereof a sufficient distance so that said performed portion will not engage the drum surface until after all or nearly all the other coils have become engaged.

2. The spring according to claim 1 having the terminal coil so formed that its peripheral friction surface gradiently recedes from and then gradiently approaches the drum contacting surface of the other coils in a direction around said terminal coil from its free end.

3. A helical clutch spring of the type adapted to be actuated by progressive radial movement from coil to coil with increasing clutching pressure toward one end into contact with a clutch drum, characterized in that less than one complete coil at said end is preformed to offset its peripheral clutching face in relation to the clutching face portions of adjacent coils a sufficient distance usually to prevent clutching contact of said peripheral end coil clutching face with the drum before the other coils have established clutching contact therewith.

4. A helical clutch spring having energizing means at one end and a series of load-carrying coils of uniform section stock and of uniform diameter adapted to operate with progressively increasing clutching pressure against a coacting cylindrical drum toward the opposite end of the spring, a portion only of the terminal coil at that end being preformed with a clutching face portion offset radially gradiently increasing and then gradually decreasing distances around said portion in reference to the clutching face portions of said uniform diameter coils to an extent such that all the uniform diameter coils will usually engage the drum before said clutching face portion of the terminal coil does so.

5. In a spring clutch including a driving member and a driven member, one of said members having a clutch engaging surface formed thereon, a helical clutch spring positively connected at one end for rotation with the other member and having a series of load-carrying coils of identical cross section for engaging said surface, the load-carrying coil at the connected end being formed gradiently in two directions circumferentially of the load carrying coil with a clutching surface sufficiently greater distances from said clutch engaging surface as compared to the clutching surface portions of the other coils to prevent engagement therewith prior to engagement of said other coils.

6. In a spring clutch including a driving member and a driven member, one of said members having a clutch engaging surface formed thereon, a clutch spring including a series of load-carrying coils of uniform section stock connected at a load-carrying end coil thereof to one of said members and with all the coils peripherally adjacent the clutch engaging surface for clutching engagement therewith, part only of the connected load-carrying coil being radially displaced gradiently relative to the other coils away from the clutch engaging surface sufficient distances to effect delayed contact of its clutching surface therewith relative to other coils of the series in the gripping direction of operation of the clutch.

7. A torque transmitting device comprising relatively rotatable coaxial members, one having a circular drum surface and the other having a pair of circumferentially facing shoulders, a helical torque-transmitting spring member with coils adapted to grip the drum and including an end coil having an outstanding lug integral therewith and positioned for contact with one of the shoulders to cause releasing movement of said coils relative to the drum, the other shoulder causing the gripping movement of the coils and being disposed in circumferential alignment with the end coil and always out of contact with the lug to avoid bending it.

STANLEY F. GORSKE.

REFERENCES CITED

The following references are of record in the file of this patent:

UNITED STATES PATENTS

| Number | Name | Date |
|---|---|---|
| 1,983,824 | Starkey | Dec. 11, 1934 |
| 2,038,063 | Starkey | Apr. 21, 1936 |
| 2,043,695 | Brownlee | June 9, 1936 |
| 2,299,722 | Burns et al. | Oct. 27, 1942 |
| 2,435,772 | Clark | Feb. 10, 1948 |

FOREIGN PATENTS

| Number | Country | Date |
|---|---|---|
| 168,984 | Great Britain | Sept. 12, 1921 |